(12) United States Patent
Shibuya et al.

(10) Patent No.: US 6,191,868 B1
(45) Date of Patent: Feb. 20, 2001

(54) DISTRIBUTED PWM HALFTONING UNIT AND PRINTER

(75) Inventors: Takeshi Shibuya, Ibaraki-ken; Tadashi Okada; Masayuki Kanda, both of Hadano; Eiji Yoshino, Hitachi; Atsushi Onose, Hitachi; Tatsuki Inuzuka, Hitachi; Toshiaki Nakamura, Hitachinaka, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/146,348

(22) Filed: Sep. 3, 1998

(30) Foreign Application Priority Data

Sep. 8, 1997 (JP) .................................................. 9-242397
Apr. 17, 1998 (JP) ................................................ 10-107341

(51) Int. Cl.[7] .............................. H04N 1/52; H04N 1/405
(52) U.S. Cl. ............................ 358/1.9; 358/534; 358/456
(58) Field of Search ............................ 358/1.9, 534, 535, 358/536, 456, 457, 458, 298, 466; 382/237, 270; 347/131, 251, 252, 196

(56) References Cited

U.S. PATENT DOCUMENTS

| | | |
|---|---|---|
| 4,783,837 | 11/1988 | Kawamura et al. . |
| 5,553,200 | * 9/1996 | Accad ................................... 358/1.9 |

FOREIGN PATENT DOCUMENTS

| | | |
|---|---|---|
| 61-125264 | 6/1986 | (JP) . |
| 6-85558 | 10/1994 | (JP) . |

OTHER PUBLICATIONS

P. Roetling, "Visual Performance and Image Coding", *SPIE/OSA vol. 74 on Image Processing*, 1976, pp. 195–199.

* cited by examiner

*Primary Examiner*—Scott Rogers
(74) *Attorney, Agent, or Firm*—Antonelli, Terry, Stout & Kraus, LLP

(57) ABSTRACT

In a halftoning unit of a laser printer and the like, a high speed, high density and high gradations halftoning is realized by multi-value implementation by clustered dot concentrated dither halftoning (known as a sub-matrix method) and PWM distributing gradation among the plurality of halftone dots with a small memory and circuit. For this purpose, the value of the difference between an input gradation value $n_i$ and a threshold value $n_c$, $\Delta n = n_i - n_c$, is shortened within a range of 0 to $\Delta h$ and the lower s bit of $\Delta h$ is removed by a round-down or round-up process. Meanwhile, a threshold array is generated from an extended threshold pattern obtained by combining threshold patterns of $2^s$ whose threshold interval is $\Delta h$, i.e. $\Delta \Delta h \times K$, $\Delta h \times K+1, \ldots, \Delta \times K+2^{(s-1)}$. Thereby, a halftone dot dither process in which the PWM gradation increases distributively among the $2^s$ dots may be realized with a small scale memory and circuit.

4 Claims, 17 Drawing Sheets

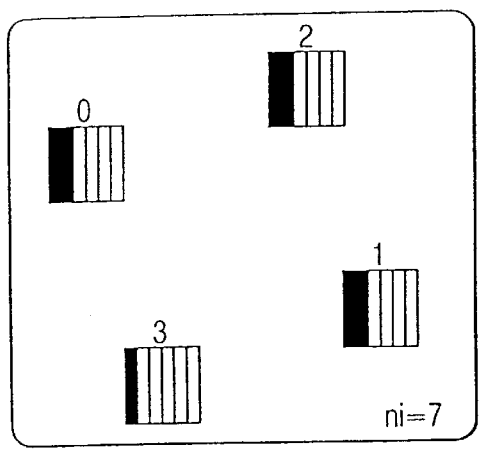
FIG. 9(a)
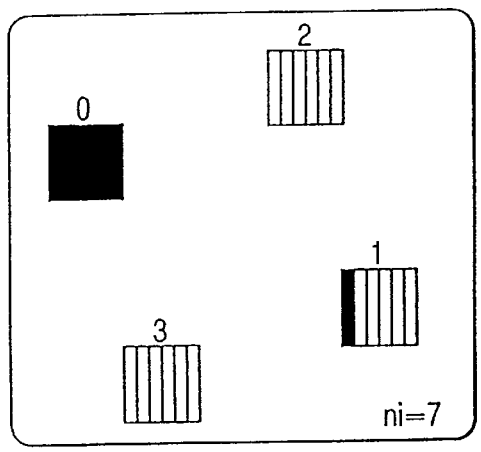
FIG. 9(b)
FIG. 10
| | BASIC THRESHOLD PATTERN K | $\theta$ | NUMBER OF CELLS | $\Delta h$ | s | NUMBER OF LEVELS OF PWM | TOTAL NUMBER OF GRADATIONS |
|---|---|---|---|---|---|---|---|
| (a) | 6 7 8 9 / 0 1 5 / 2 3 4 | 71.6° | 10 | 24 | 1 | 12 | 241 |
| | | | | | 2 | 6 | |
| | | | | | 3 | 3 | |
| (b) | 6 7 8 / 0 1 5 / 2 3 4 | 0° | 9 | 28 | 1 | 14 | 253 |
| | | | | | 2 | 7 | |
| (c) | 5 6 / 7 0 1 4 / 2 3 | 45° | 8 | 32 | 1 | 16 | 257 |
| | | | | | 2 | 8 | |
| | | | | | 3 | 4 | |
| (d) | 0 1 / 2 3 4 | 26.5° | 5 | 48 | 2 | 12 | 241 |
| (e) | 6 7 8 9 / 0 1 5 10 / 2 3 4 11 16 18 / 12 13 14 15 17 19 | 26.5° | 20 | 12 | 0 | 12 | 241 |
| | | | | | 1 | 6 | |
| | | | | | 2 | 3 | |

| BASIC THRESHOLD PATTERN | θ | NUMBER OF CELLS | Δh | PWM DIVISION NUMBER | TOTAL NUMBER OF GRADATIONS ($n_{max}$) |
|---|---|---|---|---|---|
| (a) 4 3 2 / 5 0 1 / 6 7 8 9 | 18.4° | 10 | 2 | 8 | 161 |
| | | | 4 | 4 | |
| (b) 4 3 2 9 / 5 0 1 / 6 7 8 | 71.6° | 10 | 2 | 8 | 161 |
| | | | 4 | 4 | |
| (c) 4 3 2 / 5 0 1 / 6 7 8 | 0° | 9 | 2 | 8 | 145 |
| | | | 4 | 4 | |
| (d) 3 2 / 4 0 1 7 / 5 6 | 45° | 8 | 4 | 4 | 129 |

DISTRIBUTED PWM HALFTONING UNIT AND PRINTER

BACKGROUND OF THE INVENTION

The present invention relates to an image outputting apparatus for printing an image as an array of points, (pixels), such as a printer and a facsimile, and, more particularly, the invention relates to a unit for processing an image by effecting continuous gradation by combining laser pulse width modulation (PWM) and a plurality of pixels.

Hitherto, a halftoning method, known as a dither method or an error diffusion method, has been used in a raster device, in which a pixel has a two-value (binary) output such as a digital printer and the like.

Among known dither methods in particular, there is a halftoning method called a dot concentrated dither method by means of which a threshold pattern as shown in FIG. 3b of Japanese Patent Laid-Open No. 61-125264 has been used. This method simulates halftone dots whose diameter changes corresponding to an inputted gradation by using a plurality of pixel arrays. This method has an advantage in that noise mixed into an image to be reproduced by the halftoning is not noticeable. This method also make it possible to reconcile the density of halftone dots and a number of gradations by using a sub-matrix method, as shown in FIG. 17a of Japanese Patent Laid-Open No. 61-125264, in which threshold pattern is constructed by a few halftone dots (dither) pattern which expand one after another.

A similar halftoning is also seen in FIG. 21(B) of Japanese Patent Publication No. 6-85558. Japanese Patent Publication No. 6-85558 in particular has a three-value output pixel produced by pulse width modulation (PWM) of an output laser. Then, this halftoning method adopts a procedure for determining a three-value output level by using in combination another threshold array shown in FIG. 21(A) corresponding to one shown in FIG. 21(B).

While those methods have been devised in order to reconcile the number of gradations and the resolution, they are not always enough for a laser printer of 600 dpi (dots per inch) It is required to have a density of 175 lpi of halftone dots and 256 gradations in order to reproduce an image in the level of gravure. Here, the unit "lpi" is a density of halftone dots per inch (lines per inch). "lpi" is discriminated from "dpi", i.e., the resolution of the printer engine itself.

It is impossible for a printer of around two-value and 600 dpi to create halftone dots of such a density of gradation. However, a visually discriminable number of gradations depends on the spatial frequency, and no such number of gradations is required for a high-frequency component.

According to P. Roetling, "Visual Performance and Image Coding", *SPIE/OSA Vol. 74 on Image Processing*, 1976, pp. 195–199, a discriminable number of gradations Gn with respect to a spatial frequency f (cycles/degree) maybe modeled by the following expression:

$$Gn=1010(\exp(-0.138f))(1-\exp(-0.1f))+1 \qquad (1)$$

FIG. 21 shows visual characteristics of the discriminable number of gradations in correspondence with resolution of a printer based on the expression. Solid lines in the graph indicate the discriminable number of gradations with respect to the spatial frequency according to the expression (1) Broken lines indicate the number of gradations which can be realized by the printer of n-value and 600 dpi. In FIG. 21, particular, the spatial frequency is shown by converting into a density of halftone dots at an observation distance of 30 cm and 40 cm, respectively. 1 (cycle/degree) corresponds to about 10 (lpi) at the observation distance of 30 cm.

The portion where the broken lines exceed the solid lines indicates that enough gradation can be obtained with respect to the spatial frequency. Accordingly, it can be seen from this graph that at least one dot must be a five to nine-value in order to obtain a fully smooth gradation by a printer having a resolution of 600 dpi.

Meanwhile, one halftone dot must be composed of a set of 3×3 pixels or less in order to create halftone dots of 175 lpi by a printer with a resolution of 600 dpi. The number of gradations at this time is 3×3×9+1=82 even by a nine-value printer, so that the number of gradations in the low frequency range is not sufficient. Therefore, it is impossible to obtain a sufficient gradation only by the clustering method (sub-matrix method) Further, a number of divisions of PWM cannot be increased so much to obtain the gradation only by PWM because it requires a control circuit of higher frequency at the same printing speed, thus causing a problem in increasing the speed and in terms of the packaging cost.

Therefore, it becomes necessary to use the clustering method as shown in the above-mentioned Japanese Patent Laid-Open No. 61-125246 and PWM in combination.

Further, there has been a problem that a threshold array and a comparator become large in a nine-value printer by the method of providing the threshold array corresponding to respective concentration levels of 1/3 and 2/3 of the dot concentration as shown in Japanese Patent Publication No. 6-85558.

The increase of the scale of the circuit structure and the required memory for such a method increases not only the cost, but also the burden, in developing a dedicated LSI (ASIC) for the process.

SUMMARY OF THE INVENTION

Accordingly, it is an object of the present invention to realize high speed and high quality halftoning at a low cost by providing a halftoning circuit which is capable of reconciling the clustered dot concentrated dither halftoning and PWM which can be readily realized within an ASIC with a small memory and a simple processing circuit.

In order to achieve the above-mentioned object, a halftoning unit is constructed to include a distributed PWM circuit that increases the PWM level distributively among a plurality of halftone dots based on an inputted value and a value of a lower bit of a threshold value.

More specifically a high speed, high density and high gradation halftoning is realized in an image processing unit of a laser printer and the like by realizing multi-value implementation by clustered dot concentrated dither halftoning (known as a sub-matrix method) and PWM distributed gradation among the plurality of halftone dots with a small memory and a simple circuit. For this purpose, the value of a difference between an input gradation value $n_i$ and a threshold value $n_c$, $\Delta n = n_i - n_c$, is shortened within a range of 0 to $\Delta h$ and the lower s bit of $\Delta h$ is removed by a round-down or round-up process. Meanwhile, a threshold array is generated from an extended threshold pattern obtained by combining threshold patterns of $2^s$ whose threshold interval is $\Delta h$, i.e., $\Delta h \times K$, $\Delta h \times K+1$, ..., $\Delta h \times K+ 2^{(s-1)}$. Thereby, the halftone dot dither process in which the PWM gradation increases distributively among the $2^s$ dots may be realized by mean of the small scale memory and circuit.

The specific nature of the invention, as well as other objects, uses and advantages thereof, will clearly appear from the following description and from the accompanying drawings.

BRIEF DESCRIPTION OF DRAWINGS

FIGS. 9(a) and 9(b) are diagrams for explaining an effect of the invention;

FIG. 10 is a table showing exemplary basic threshold patterns for realizing other screen angles;

DESCRIPTION OF PREFERRED EMBODIMENTS

Preferred embodiments of the present invention will be explained with reference to the drawings.

Figure 1:
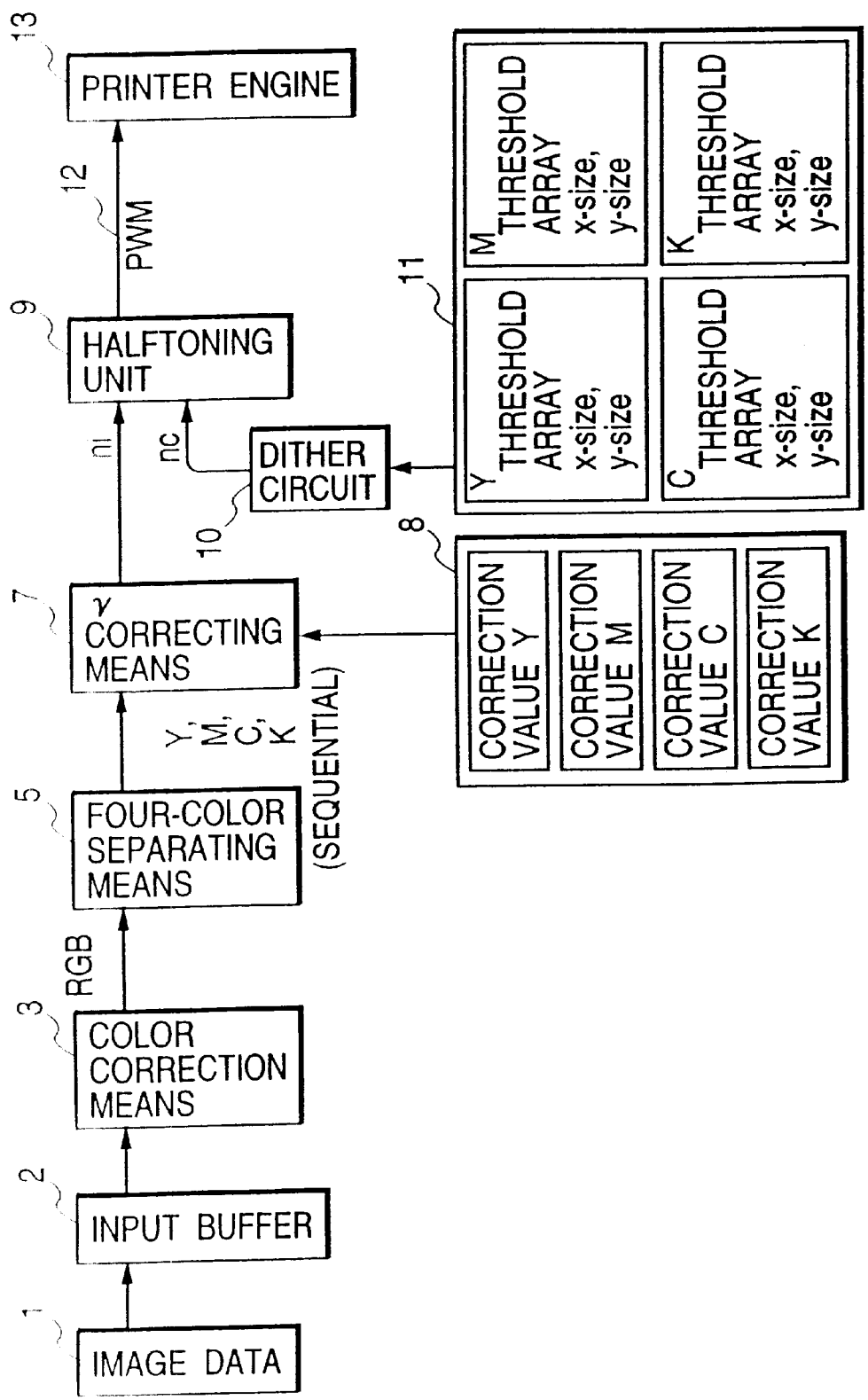
FIG. 1 is a block diagram showing a flow in the processing of data according to the present invention.

FIG. 1 is a block diagram showing a flow in processing images in a color laser printer having a resolution of 600 dpi to which an inventive halftoning unit is applied. Image data 1 which is to be printed is stored in an input buffer 2 as RGB data of one page. A printer engine 13 repeats the process on and after the input buffer 2 shown in FIG. 1 for one color image four times for four images of YMCK in order to develop the image per each face (each color) of YMCK.

At first, four-color separating means 5 initializes the inside as necessary so as to calculate Yellow from RGB pixel sequential data. In correspondence to that, γ correction means 7 loads a correction value corresponding to Yellow from a γ correction value table 8 to a reference table inside. Further, a dither circuit 10 loads a threshold array and size data of that array corresponding to Yellow from a table 11 to initialize the inside. The threshold array is an array of values represented by 8 bits of an integer from 0 to 255 or less like a threshold array 27 shown in FIG. 8.

Thereby, after undergoing color correction by color correcting means 3, conversion to Yellow data by the four-color separating means 5 and gradation correction by the γ correcting means 7, the RGB data sent from the input buffer 2 is outputted to the printer engine 13 by a halftoning unit 9 as a PWM signal 12.

After ending the process of one page of Yellow, the four-color separating means 5, the γ correcting means 7 and the dither circuit 10 load respective parameters again necessary for Magenta to initialize the process and to send a PWM signal 12 of one page of Magenta to the printer engine 13 in the same manner.

Processes for Cyan and Black are also implemented in the same manner. The respective color faces are changed over in synchronism with a vertical synchronizing signal of the printer engine. At this time, the threshold array may be set so that they can be changed per each color face.

Figure 2:
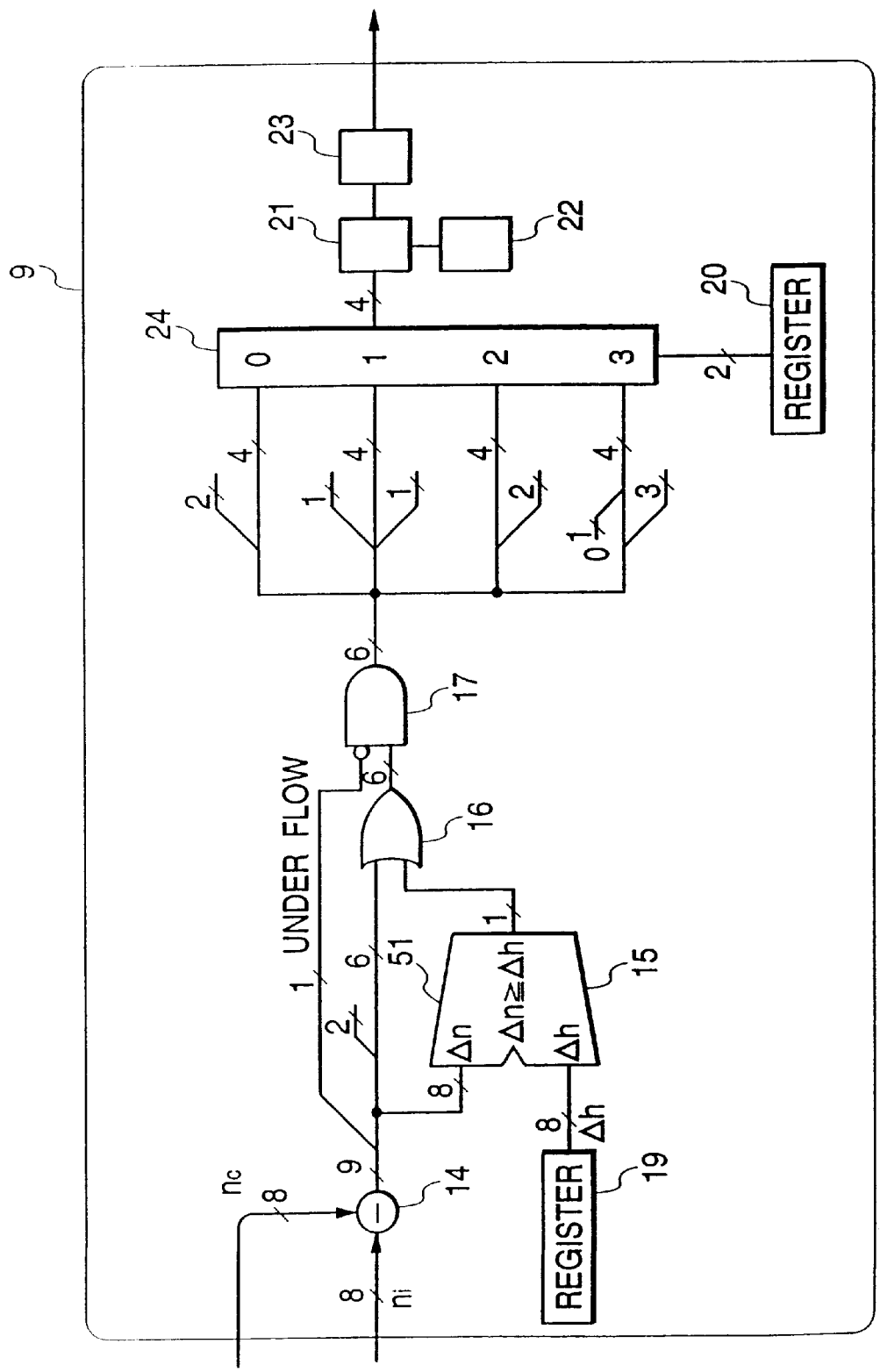
FIG. 2 is a schematic diagram showing an example of a halftoning unit (round-down circuit)
Figure 3:
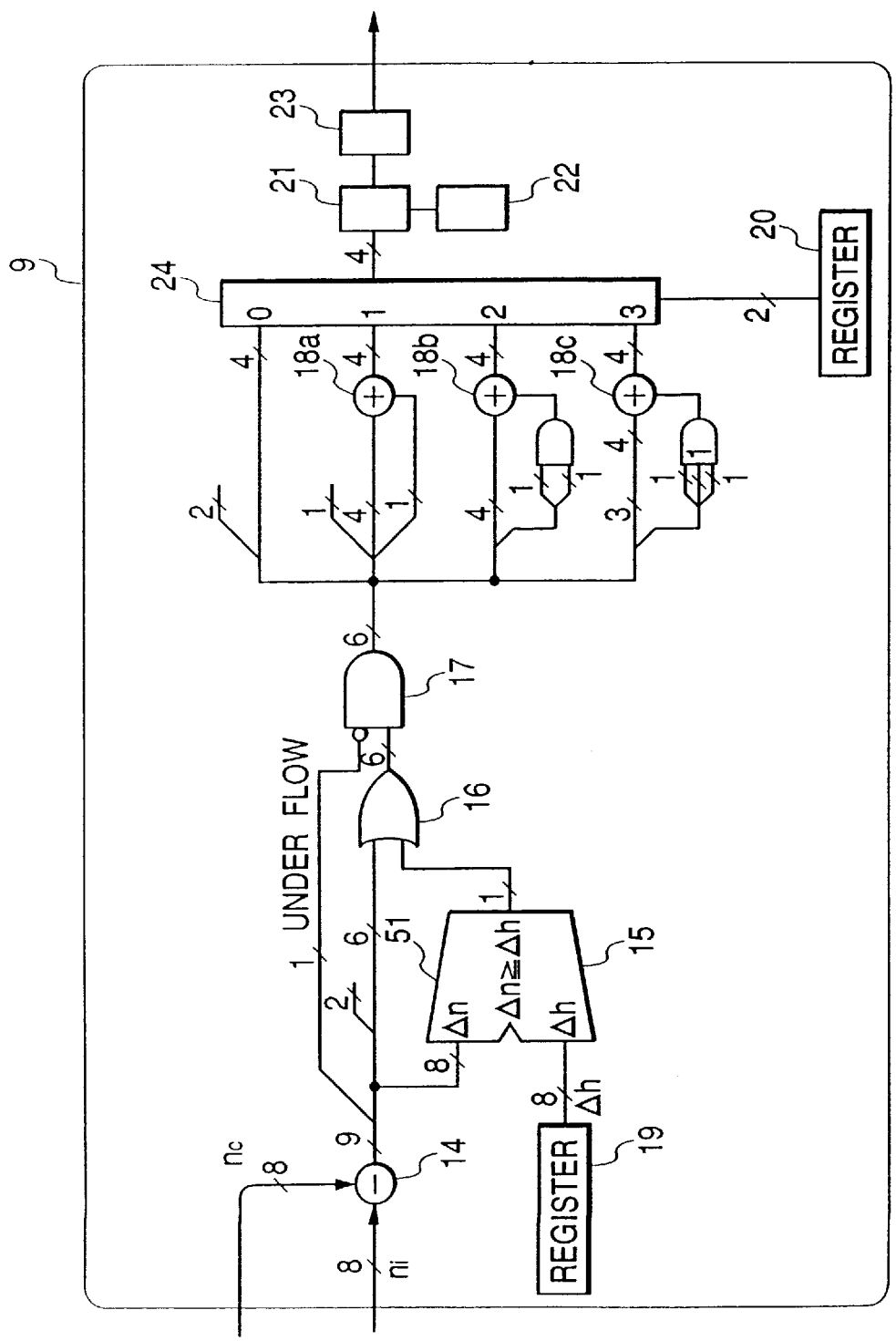
FIG. 3 is a schematic diagram showing an example of a halftoning unit (round-up circuit)

FIGS. 2 and 3 show exemplary halftoning units 9. In these examples, the input gradation value to the halftoning unit 9 is 256 gradations (8 bits) and the number of divisions of 1 dot by PWM is 16 (4 bits), i.e, 17 levels (0 to 16).

In a first half toning process including a NAND circuit 17 in FIG. 2, a difference between a gradation range of an input gradation value $n_i$ and a dither threshold value $n_c$, $\Delta n = n_i - n_c$, is found by a subtracting circuit 14. When $\Delta n < 0$, all bits of an output from the NAND circuit 17 is zeroed by an underflow signal of the subtracting circuit 14. When $\Delta n \geq 0$, a comparator 15 compares $\Delta n$ with a threshold interval $\Delta h$ that is preset in a register 19 as an upper limit value of the difference $\Delta n$. Then, when $\Delta n \geq \Delta h$, an output of the comparator 15 is set to 1, and all 6 bits are set to 1 (=full) by an OR circuit 16, regardless of the input value so as to be output via the NAND circuit 17. In the other case (when $0 \leq \Delta n < \Delta h$), a value (6 bits) inputted to the OR circuit 16 is outputted from the NAND circuit 17 as it is and $\Delta n$ of 8 bits integer is shortened to a value of 0 through $\Delta h$ of 6 bits (and all bits=1).

In the later stage of the NAND circuit 17, a selecting circuit 24 selects 4 bits from a signal line of 6 bits of the output of the NAND circuit 17 based on a value s=0 through 3 decided in advance in a register 20 by $\Delta h$, as follows:

When s=0, truncate upper 2 bits and select lower 4 bits;

When s=1, truncate upper 1 bit and lower 1 bit and select middle order 4 bits;

When s=2, truncate lower 2 bits and select upper 4 bits; and

When s=3, truncate lower 3 bits and select 4 bits to which 0 signal of 1 bit is added to the upper order.

This operation is equivalent to logical right-shifting the output value of 6 bits of the NAND circuit 17 and to truncate the overflow bits. Thus, 's' will be called a bit shift amount hereinafter. This process corresponds to selecting a bit number conforming to a number of divisions of PWM by dividing the output of the NAND circuit 17 by $2^5$ and by truncating the remainder. In this sense, the circuit shown in FIG. 2 is a "round-down circuit".

The bit shift amount s corresponding to $\Delta h$ is determined concretely as follows. When $1 \leq \Delta h < 16 (=2^4)$, s is selected within a range from 0 to 3, when $16 \leq \Delta h<32(=2^5)$, s is selected in a range of s=1 to 3, and when $32<\Delta h<64(=2^6)$, s=2 or 3.

Utilizing the signal whose stage is reduced to 4 bits in these processes as an index, a PWM level correcting circuit 21 converts a PWM gradation value further in accordance with a value set in advance in a PWM conversion table 22, i.e., a reference table, and outputs a final actual output level value to a PWM generating circuit 23 that performs multi-value gradation control by PWM.

Figure 4:
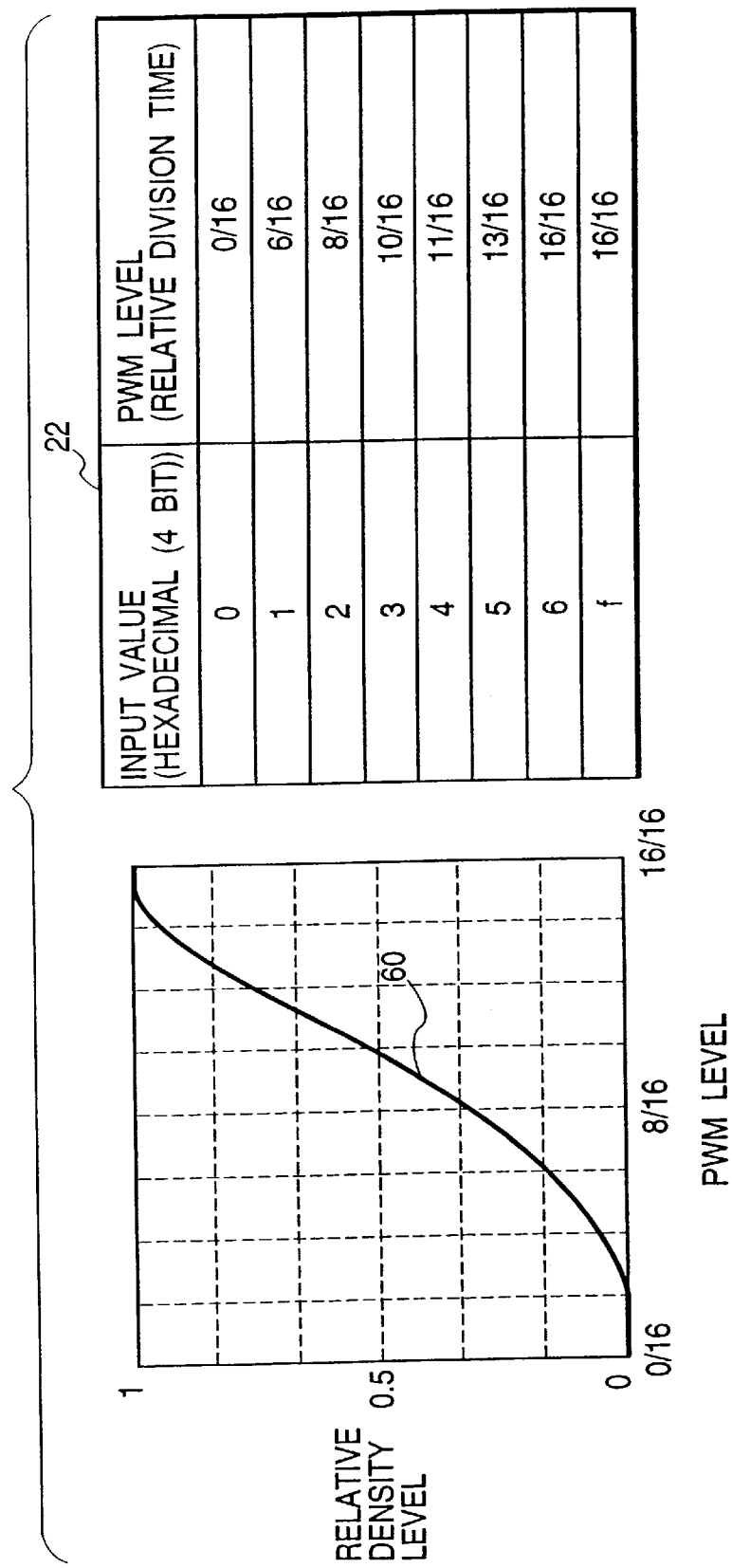
FIG. 4 is a chart for explaining correction of PWM levels.

FIG. 4 shows an exemplary PWM conversion table 22 for when the PWM division number is 16 and there are 8 levels of input values of 0 through 6 and f.

In FIG. 4, correction is performed so that a relative density 60 with respect to a relative value of the division time of laser pulse to 1 dot by PWM becomes almost linear. Further, the input value 6 and the input value f (full bit=1) are made to correspond to the same maximum level value for a reason to be described 378 later.

It is noted that concerning the difference $\Delta n$ in the above explanation, the upper 2 bits of 8 bits excluding the underflow signal have been truncated before being inputted to the OR circuit 16, and so the truncating position on the circuit of the upper 2 bits is not so important. Further, although $\Delta h$ has been a value smaller than 64 (6 bits) and the output of the NAND circuit 17 has been 6 bits in the embodiment shown in FIG. 2, the limit of 6 bits is not essential as a matter of course. For example, it is easy to process the output of the NAND circuit 17 in the state of 8 bits and to mount the selecting circuit for 24 as a circuit selecting any one of the followings:

truncate upper 4 bits (s=0);
truncate upper 3 bits and lower 1 bit (s=1);
truncate upper 2 bits and lower 2 bits(s=2);
truncate upper 1 bit and lower 3 bits (s=3); and
truncate lower 4 bits (s=4). In this case, because there are five bit shift amounts s of 0 through 4, the signal line for the selection signal from the register 20 requires 3 bits.

The embodiment shown in FIG. 3 differs from the round-down process in FIG. 2 only in that it performs a round-up process. In FIG. 3, adders 18a, 18b and 18c provided in the pre-stage of the selecting circuit 24 operate to add an OR value of the lower bit truncated, when s=1 through 3, to the remaining upper 4 bits output to the PWM level correcting circuit 21. Thereby, the circuit shown in FIG. 3 operates as a "round-up circuit" that divides the output value of the NAND circuit 17 by $2^s$ and by rounding up the remainder corresponding to the value of the bit shift amount s of the selecting circuit 24.

Figure 5:
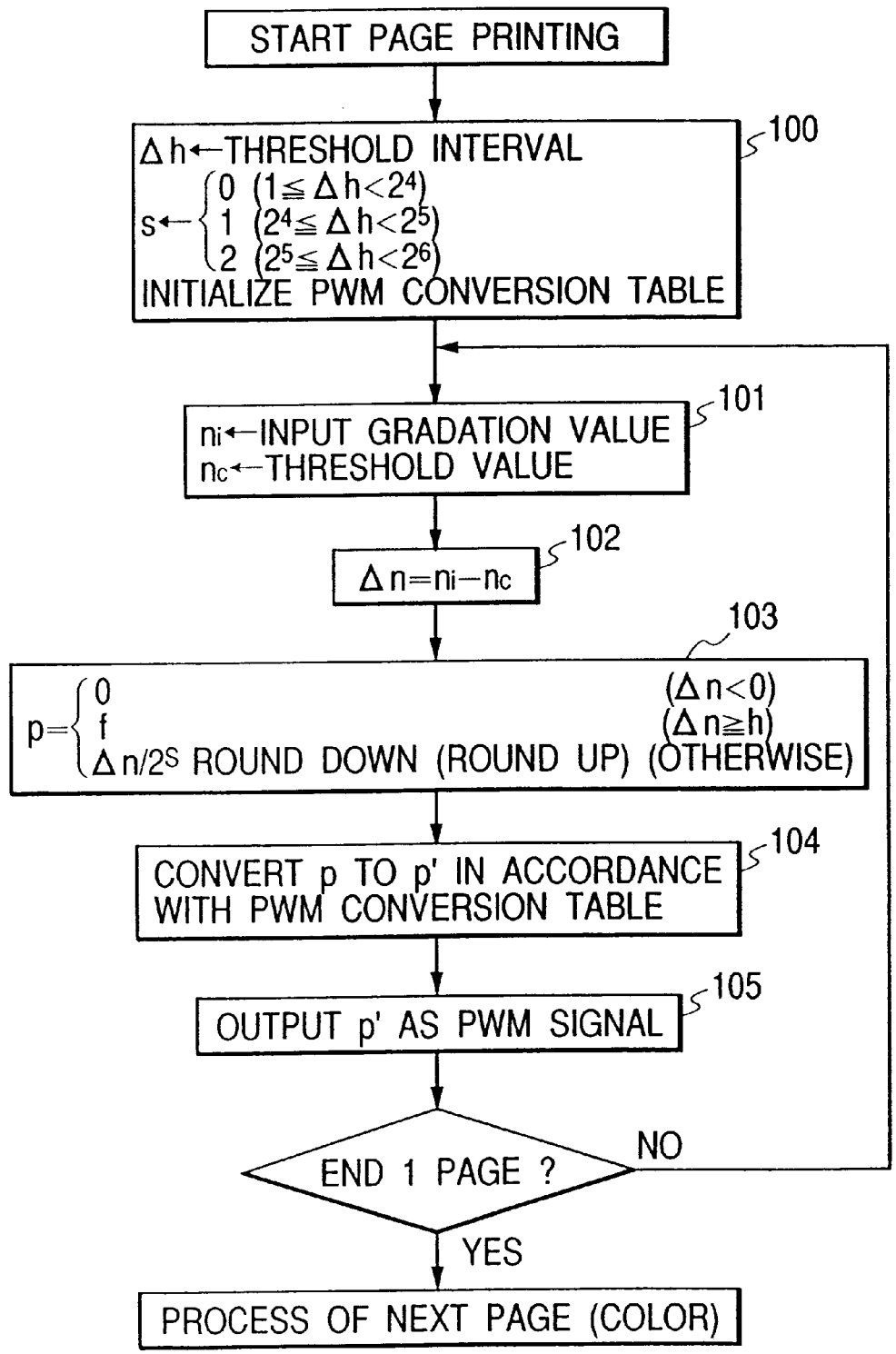
FIG. 5 is a flowchart showing an operation of the halftoning unit.

FIG. 5 is a flowchart showing the above-mentioned processes. The processes are performed per page of each color face. At first, in the initialization Step 100 preceding the page process, the threshold interval $\Delta h$ is loaded from the register 19 and the bit shift amount s is loaded from the register 20, respectively. While the bit shift amount s is a value determined in advance corresponding to $\Delta h$ as a sufficient value for shortening $\Delta h$ to 4 bits, which is the number of divisions by PWM, it may be automatically determined from $\Delta h$ in accordance with the example of the initialization Step 100 in FIG. 5. The PWM conversion table 22 for converting the PWM output value p into an actual output level value p' is also loaded in the initialization Step 100.

The input gradation value $n_i$ and the threshold value $n_c$ are loaded in Step 101 and the difference $\Delta n$ thereof is calculated in Step 102. The threshold value $n_c$ in Step 101 is inputted sequentially in synchronism with the input pixel value $n_i$ based on the threshold array 27 or a simplified threshold array 28 shown in FIG. 8 and described later for the dither circuit 10 in FIG. 1.

$\Delta n$ is then compared with $\Delta h$ in Step 103. The PWM output value p is set as p=0 if $\Delta n<0$, as p=f (hexadecimal) if $\Delta n \geq \Delta h$ and as $p=(\Delta n/2^s)$ if $0 \leq \Delta n<\Delta h$. However, the processing of the remainder when $\Delta n$ is divided by $2^s$ is round-down in the round-down process performed circuit shown in FIG. 2 and is a round-up process performed in the round-up circuit shown in FIG. 3.

The final PWM output level p' is obtained by the PWM level correcting circuit 21 by using the PWM output value p as an index in accordance with the PWM conversion table 22 in Step 104.

Finally, the PWM output level p' is outputted to the printer engine 13 by the PWM generating circuit 23 as a pulse-width modulated PWM signal in Step 105.

The halftoning unit 9 repeats the above-mentioned processings between Step 101 until ending the processes of one page of pixels and then repeats the process shown in FIG. 5 from the beginning for processings the next page or the next color face.

Figure 6:
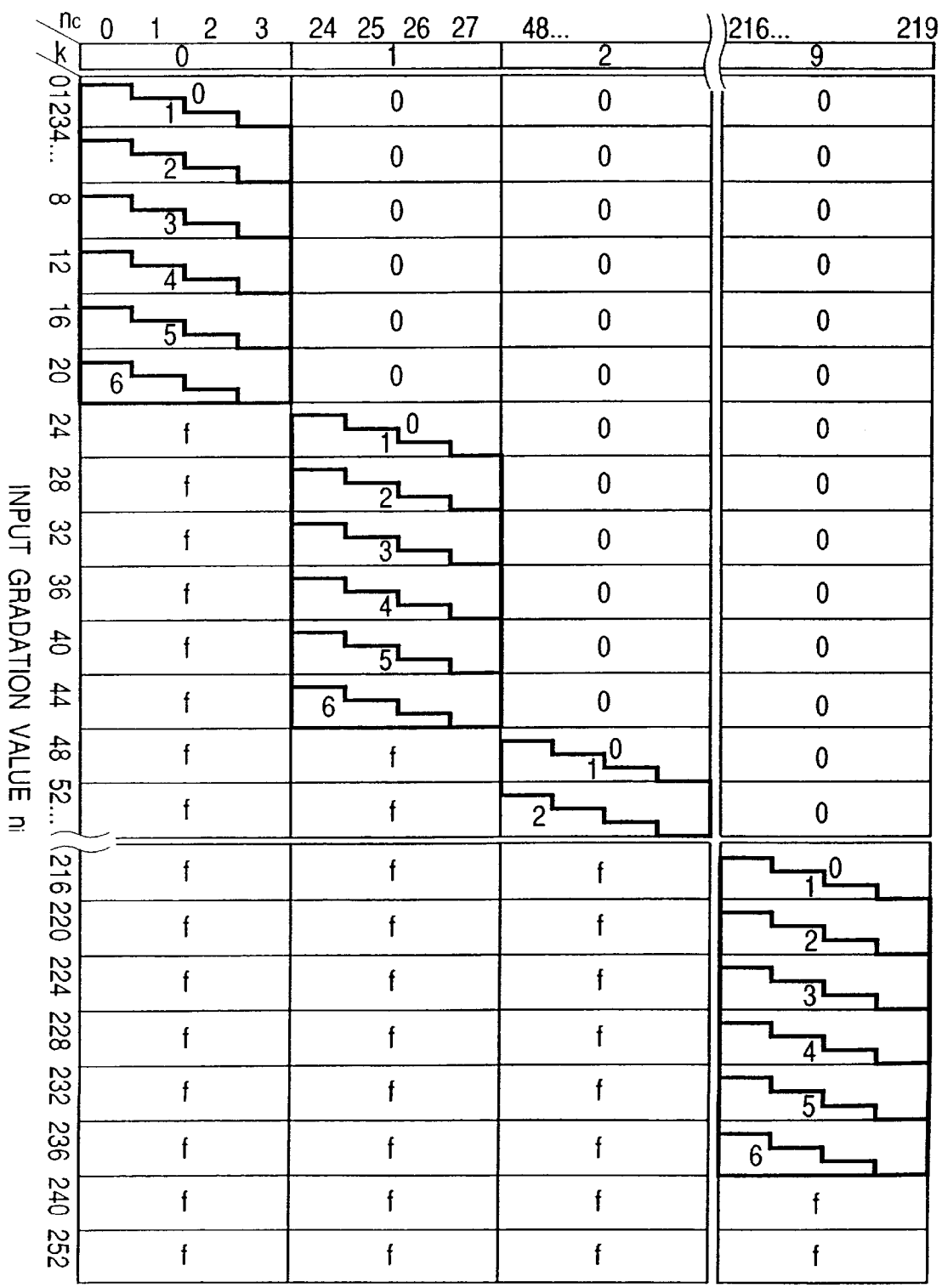
FIG. 6 is a table showing examples of correspondence of input/output by the round-up circuit.
Figure 8:
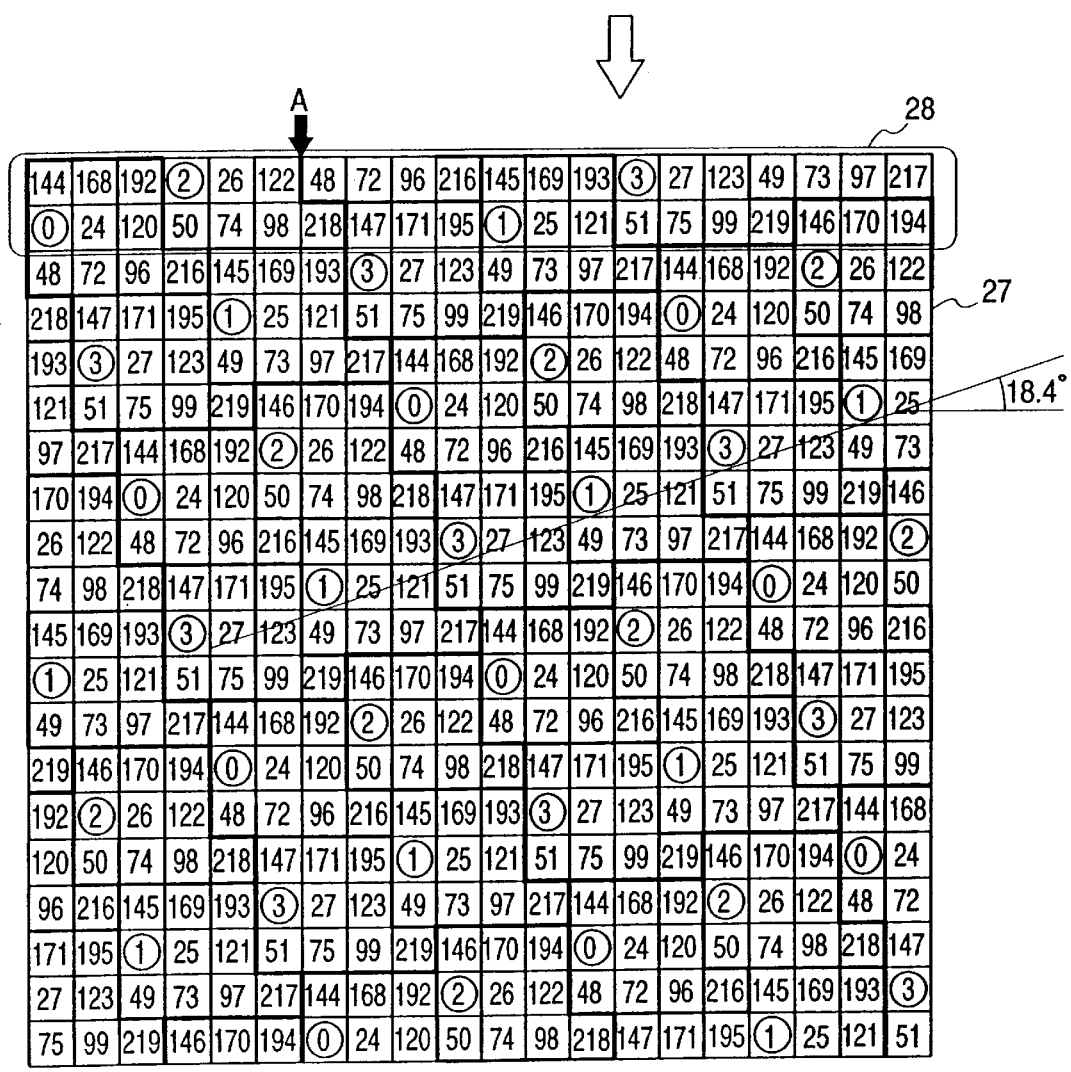
FIG. 8 is a flow diagram showing a method of composing a threshold array from a basic threshold pattern.

FIG. 6 is a table showing examples of correspondence of input/output values produced by the round-up circuit shown in FIG. 3. In FIG. 6, the PWM output values p from the selecting circuit 24 when $\Delta h=24$ and s=2 are shown by a hexadecimal chart having rows of the input gradation value $n_i=0$ through 255 and columns of the threshold value $n_c$ of 4×10 sets, i.e., $n_c=\{24k, 24k+1, 24k+2, 24k+3\}$ (k=0, 1, 2, . . . , 9). FIG. 8 shows an exemplary disposition of such sets of threshold values as the threshold array 27.

While the output values are at the seven levels of 1, 2, 3, 4, 5, 6 and f (full), except for 0, in FIG. 6, these values are corrected by the PWM level correcting circuit 21 in FIG. 3 as PWM output levels so that equal gradation can be obtained in accordance with the PWM conversion table 22. The output values 6 and f (hexadecimal) in particular of the selecting circuit 24 are made to correspond to the same actual output level value by the PWM level correcting circuit 21. In this case, the number of levels of PWM (a number of levels of the PWM except of 0 and f) is six. Thereby, a logical number of output gradations in a combination of 40 threshold values in FIG. 6 turns out to be 241 (6×40+1) gradations.

Figure 7:
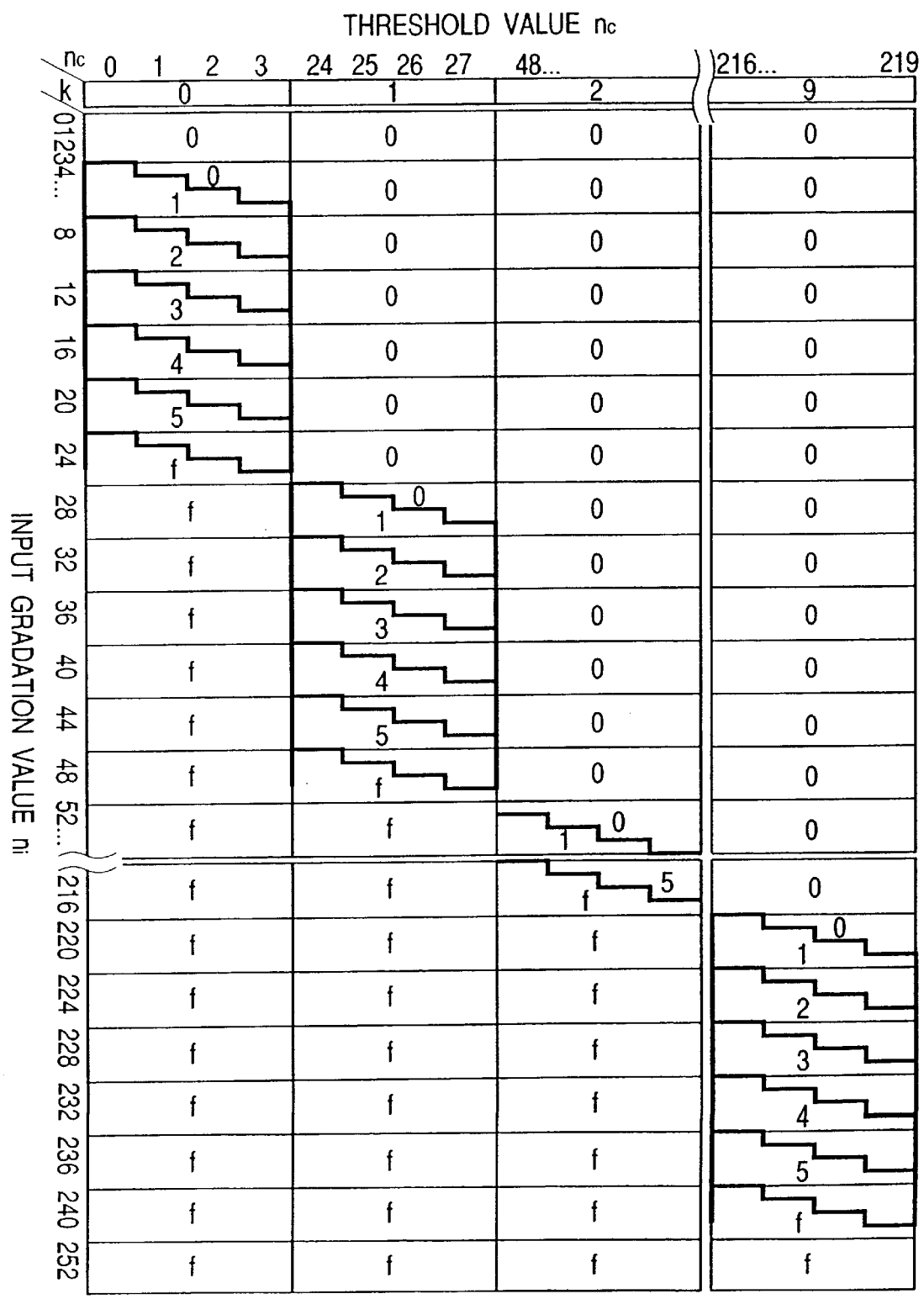
FIG. 7 is a table showing examples of correspondence of input/output by the round-down circuit.

FIG. 7 is a similar table showing examples of correspondence of input/output values produced by the round-down circuit (FIG. 2) when $\Delta h=24$, s=2 with respect to the set of threshold values. In this case, although the outputs corresponding to the input gradation values 0 through 4 are all zeroed, normally a "jump" of this degree of a high-light region will not affect an output image so much.

The correspondence of input/output (FIG. 5) equal to that of the round-up circuit may be readily realized by adding a circuit for adding a constant offset value $n_0=3$ in the γ input section in FIG. 2 if necessary. Or, the equal input/output correspondence may be more readily realized by giving an offset of $n_0=3$ to the output of the γ correcting means 7 in the pre-stage from the beginning.

Conversely, the relationship between $\Delta n=n_i-n_c$ and the PWM output value p by the round-up circuit in FIG. 6 becomes almost an equivalent process with the round-down circuit that will not depend on the lower s=2 bits of $\Delta n+n_0=n_i+n_0-n_c$ by adding an offset of $n_0=1$ to the input value $n_i$.

Thus, the PWM output value p is determined regardless of the lower s bit of a value $\Delta n+n_0$ obtained by offsetting the value of the difference Δn adequately in the embodiments in FIGS. 2 and 3. That is, the round-down process of the lower bits to the value of the difference of the input value and the threshold value is the essential process carried out in the circuits in FIGS. 2 and 3.

FIG. 8 is a chart showing a method for composing a threshold array for realizing the distributed PWM process in combination with the halftoning units 9 shown in FIGS. 2 and 3. Similarly to the preceding examples, Δh and s are set as Δh=24 and s=2.

At first, a basic threshold pattern 25 is set as K and an extended threshold pattern 26 is composed by four threshold patterns generated from K, i.e., K×Δh, K×Δh+1, K×Δh+2 and K×Δh+3.

Next, the threshold array 27 shown in FIG. 8 is obtained by filling the extended threshold patterns 26 in a rectangular area closed periodically both in the row and the column directions. While the dither circuit 10 generates the threshold value $n_c$ by periodically and repeatedly using the threshold array 27, the threshold array 27 has a structure in which the upper two rows are stacked below by ten stages while shifting data to the left at the position (the sixth column) indicated by an arrow A in the figure. Accordingly, the memory on the package may be saved further by repeatedly using a simplified threshold array 28 composed of the two upper rows, instead of the whole threshold array 27, while shifting an initial address column by six columns for each of every two rows of the input image in synchronism with a horizontal synchronizing signal of the printer engine 13.

FIGS. 9(a) and 9(b) show an effect of the distributed processing of the threshold array 27 composed as described above and the PWM obtained by the halftoning unit 9 shown in FIG. 3. When PWM and the clustering are simply combined with the extended threshold pattern 26 and no distributed processing of PWM is carried out like the prior art, an image output to $n_i$=7 turns out to be a rough halftone dot image having significant noise in which the irregularity of dots and the irregularity of a dot diameter are stressed, as shown in FIG. 9(b). In contrast to that, when the distributed processing of PWM is implemented by the halftoning unit 9, the output image turns out to be a homogeneous and smooth halftone dot image in which the half-tone image caused by PWM increases cyclically in the four areas as shown in FIG. 9(a).

The threshold array 27 in the above explanation outputs a halftone screen which consists of a lattice of halftone dots. This halftone screen forms an angle of about 18.4° with respect to the horizontal direction for uniform half-tone values as indicated by circles in FIG. 8. The angle formed by the halftone screen with respect to the horizontal direction is called as a screen angle. A different screen angle is used per each color face in order to stabilize a reproduced color in ordinary color printing.

FIG. 10 shows examples of the basic threshold pattern K corresponding to various screen angles θ, the threshold interval Δh and bit shift amount s. The values within the table have a relationship of:

$$\Delta h = 2^s \times (\text{number of levels of PWM(except of 0))} \text{ (total number of gradations)} = (\text{number of cells}) \times \Delta h + 1$$

As described before, the bit shift amount s is given a degree of freedom in its setting for the following reason. Because the gradation characteristic by PWM differs depending on the printer engine, in general, a homogeneous and high density image may be obtained by adopting a smaller value s for a printer engine providing a sufficient gradation characteristic by PWM. However, when the gradation characteristic provided by PWM is not enough and the number of gradations actually corresponding to a pulse division number as a signal is small, high gradation may be obtained by adopting a larger value of s.

In the case of color printing, a reproduced image in which moire, which is otherwise caused by overlapping halftone dots, is hardly seen comparatively by allocating the threshold pattern in FIG. 8 to Cyan, in line (a) in FIG. 10 to Magenta, in line (b) in FIG. 10 to Yellow, and in line (c) in FIG. 10 to Black. The patterns to be allocated to Magenta and Cyan may be reversed.

Figure 11:
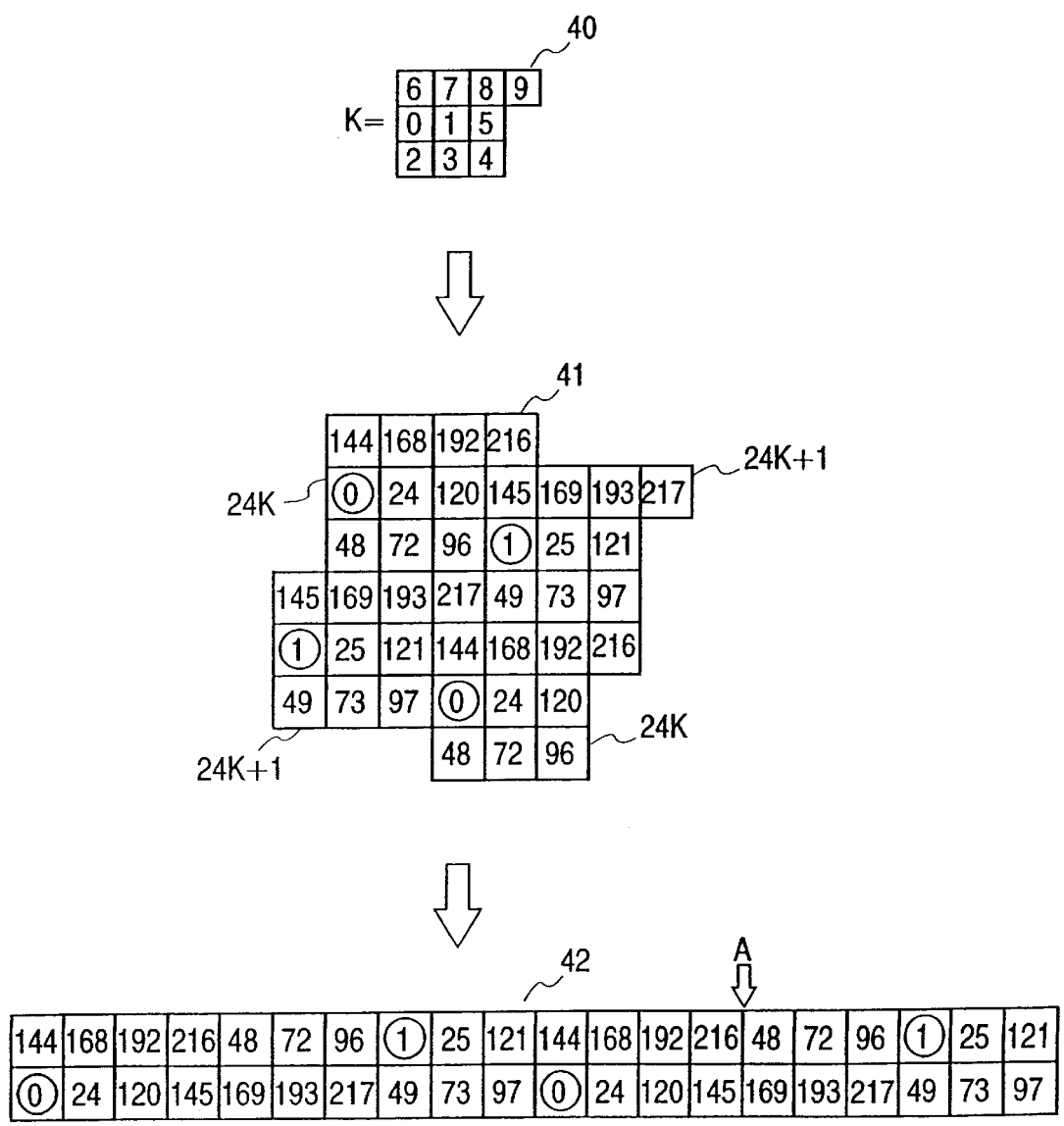
FIG. 11 is flow diagram which shows an example for composing a simplified threshold array from the other basic threshold pattern.
Figure 12:
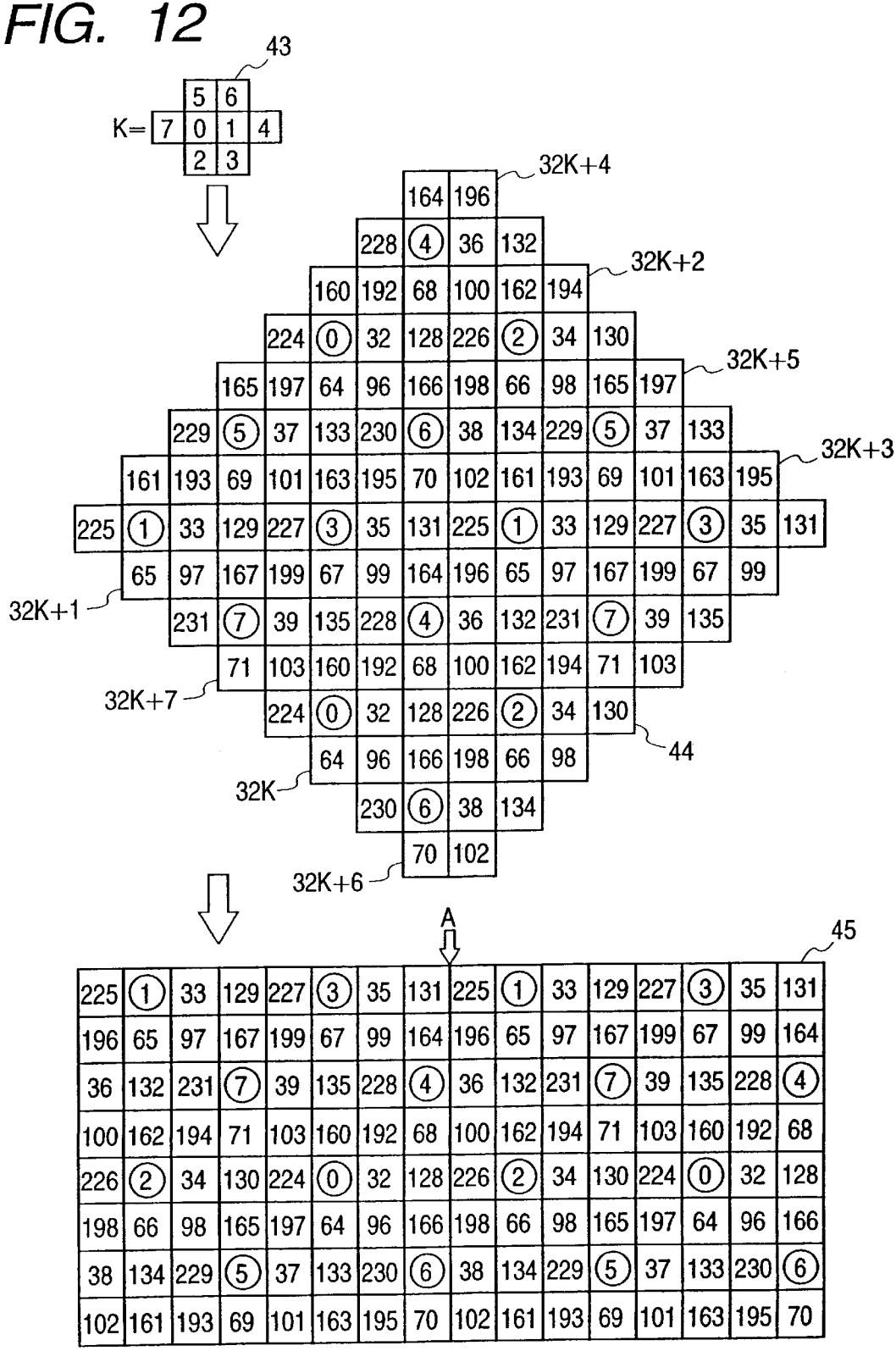
FIG. 12 is a flow diagram which shows an example for composing a simplified threshold array from the other basic threshold pattern.

The method for composing the extended threshold pattern and the threshold array by the basic threshold pattern K is almost the same as the method for composing the threshold array 27 described above with reference to FIG. 8. As examples of the case when the bit shift amount s is different, in particular, FIG. 11 shows an extended threshold pattern and a simplified threshold array corresponding to s=1 in line (a) in FIG. 10 and FIG. 12 shows an extended threshold pattern and a simplified threshold array corresponding to s=3 in line (c) in FIG. 10. In these figures, threshold values on the extended threshold pattern corresponding to a threshold value 0 in the basic threshold pattern are indicated by circles so that the feature of the disposition can be readily recognized. Similar to the case of FIG. 8, the threshold array may be obtained from the simplified threshold arrays 42, 45 in those figures by repeating the simplified threshold array while shifting the column at the position indicated by an arrow A in the figures.

Figure 13:
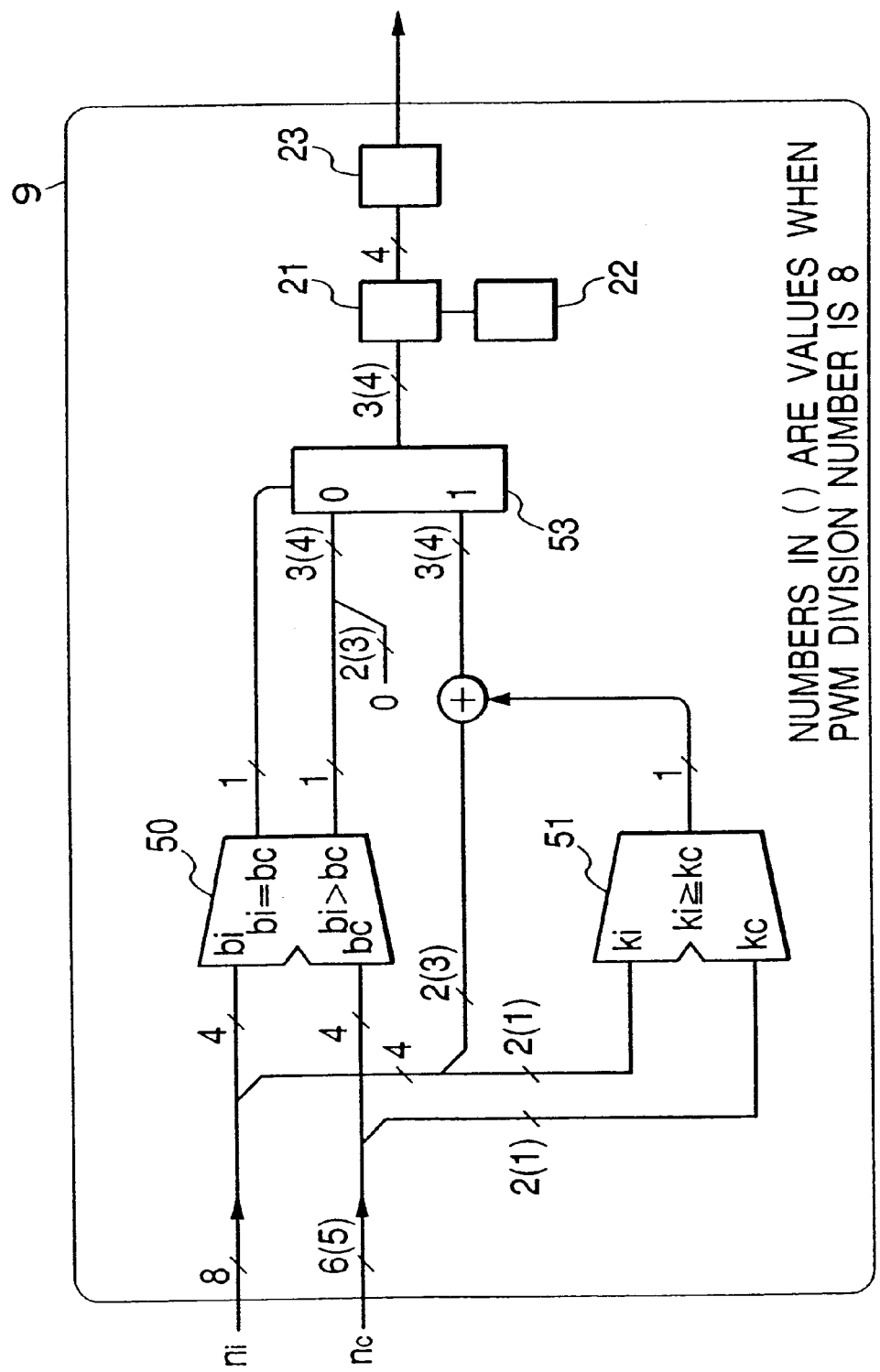
FIG. 13 is a schematic diagram showing an example of a halftoning unit (bit partitioning circuit)
Figure 14:
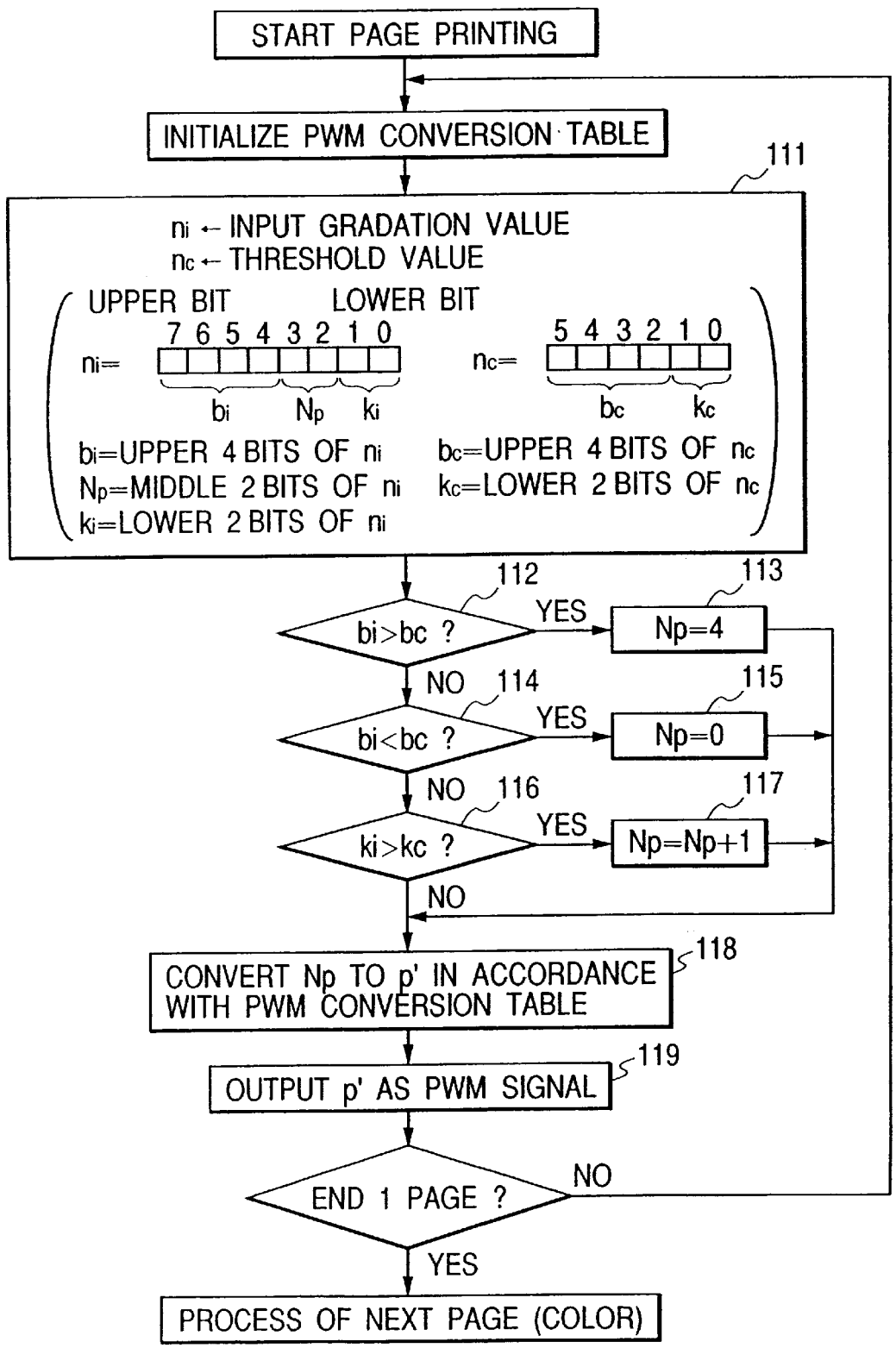
FIG. 14 is a flowchart showing an operation of the bit partitioning circuit.

FIG. 13 shows another embodiment of the halftoning unit 9 which makes it possible to obtain almost the same PWM distributed effect as the round-up circuit shown in FIG. 3. Because the circuit in the present embodiment processes the bits of data by dividing it into several parts, it will be called a "bit partitioning circuit", as opposed to the above-mentioned "round-up circuit" and "round-down circuit". FIG. 14 shows the concept of the process flow of the bit partitioning circuit.

In the present embodiment, the number of PWM gradations of 1 dot is a five-value (PWM division number: 4) of 0 through 4 and PWM is distributed as follows among 4 dots.

Although data related to an image is handled normally in a unit of 8 bits, it is handled as 6 bits by neglecting the upper 2 bits of the threshold value $n_c$ from the beginning for the purpose of simplification. It is also possible to arrange to neglect 2 bits at other position like the lower 2 bits a matter of course. When the lower 2 bits are to be neglected, the threshold value in the following explanation should be read by shifting the data by 2 bits, i.e., by quadrupling.

At first, the wiring of the input gradation value is divided so that 4 bits sequentially from the upper bit of the value of gradation $n_i$ of the input pixel of 8 bits corrected by the γ correcting means 7 turn out to be a block index $b_i$, the ensuing 2 bits turn out to be a PWM level value $N_p$, and the remaining lower 2 bits turn out to be a rotation index $k_i$. Further, the wiring of the threshold value is divided so that 4 bits from the upper bit of the 6 bit threshold value $n_c$, which is the threshold value loaded by the dither circuit 10, turns out to be a block index $b_c$ and the lower 2 bits turn out to be a rotation index $k_c$ (Step 111 in FIG. 14).

A comparator 50 corrects the PWM level value $N_p$ by the following rule by comparing the size of the block indices $b_i$ and $b_c$. When $b_i > b_c$, it forces the value $N_p$ to be $N_p$=4 (Step 113). When $b_i < b_c$ (Step 114), it forces the value $N_p$ to be $N_p$=0 (Step 115). When $b_i = b_c$, a comparator 51 compares the rotation indices $k_i$ and $k_c$ (Step 116) and adds 1 to the PWM level value $N_p$, only when $k_i>k_c$ (Step 117). The value $N_p$ is not corrected in the other cases.

At this time, in order to switch the process when $b_i=b_c$, the comparator 50 switches the output in the case of FIG. 13. The four color separation means 50 outputs a true/false value of $b_i=b_c$ and a true/false value of $b_i>b_c$ by positive logic. Selecting means 53 selects an output of an adder 52 when $b_i=b_c$ and selects a value obtained by shifting the true/false value of $b_i>b_c$ by 2 bits (i.e., by quadrupling) when $b_i \ne b_c$ by a selection signal of the true/false value of $b_i=b_c$. Finally, the PWM level correcting circuit 21 converts the PWM output value $N_p$ into a PWM level value p' (Step 118).

Figure 15:
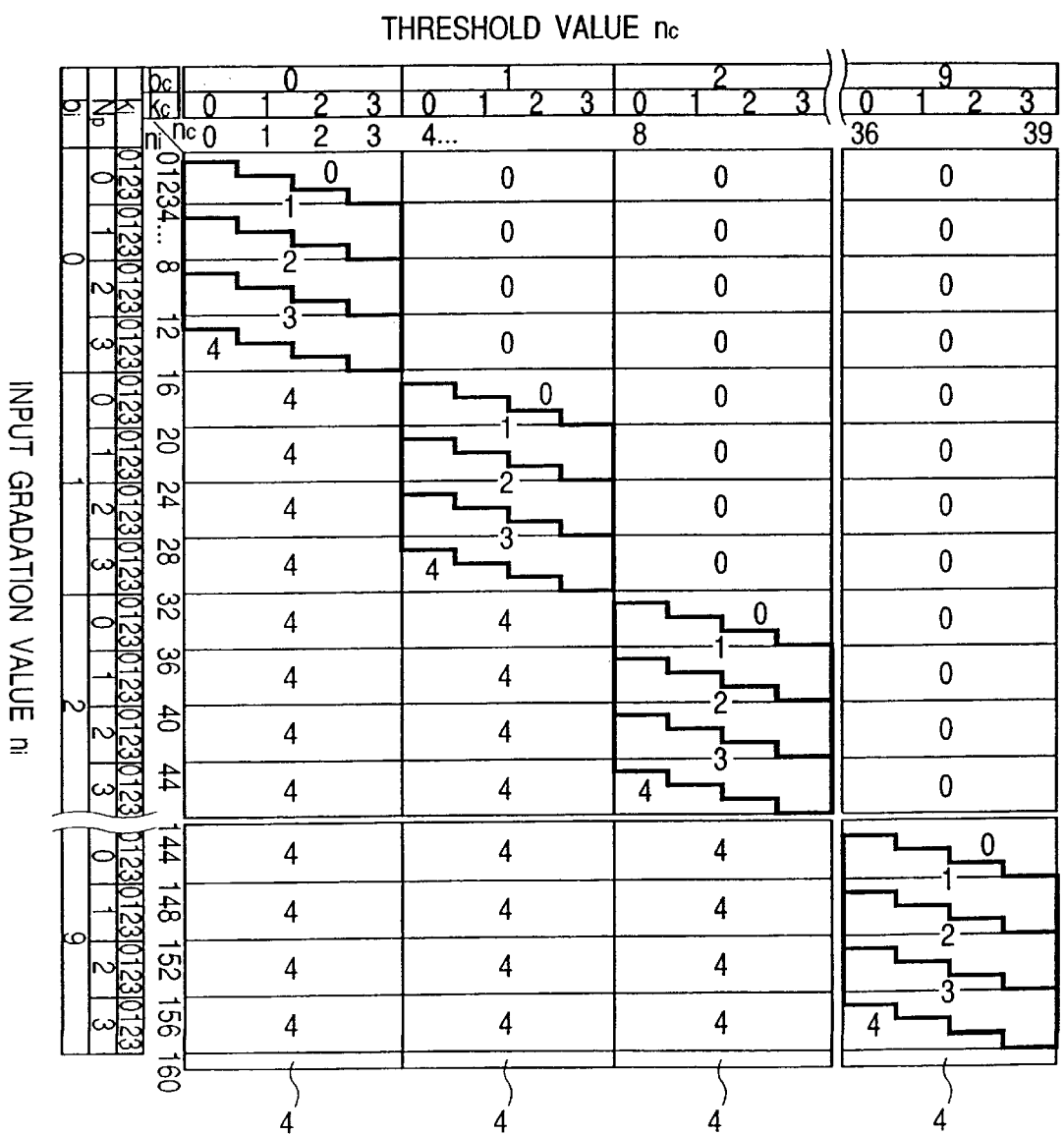
FIG. 15 is a table showing examples of correspondence of input/output by the bit partitioning circuit.

FIG. 15 shows the PWM output values of the present embodiment in the form of a table. In FIG. 15, a set of threshold values like a threshold pattern 56 in FIG. 16 having 40 kinds of threshold values is assumed in FIG. 15.

While the embodiment corresponding to the PWM division number 4 has been described above, a circuit corresponding to a PWM division number 8 may be constructed almost by the same circuit. In this case, the bit dividing method of the corresponding bit partitioning circuit (FIG. 13) is changed as indicated by parentheses in FIG. 13. That is, the wiring of the input gradation value is divided so that 4 bits sequentially from the upper bit of the gradation value $n_i$ of the input pixel turns out to be a block index $b_i$, the ensuing 3 bits to be a PWM level value $N_p$, and the remaining lower 1 bit to be a rotation index $k_i$. Further, the wiring of the threshold value is divided so that 4 bits from the upper bit of the four color separation means 5 bit threshold value $n_c$ which is the threshold value loaded by the dither circuit 10 turns out to be a block index $b_c$ and the lower 1 bit turns out to be a rotation index $k_c$.

Figures 16, 17:
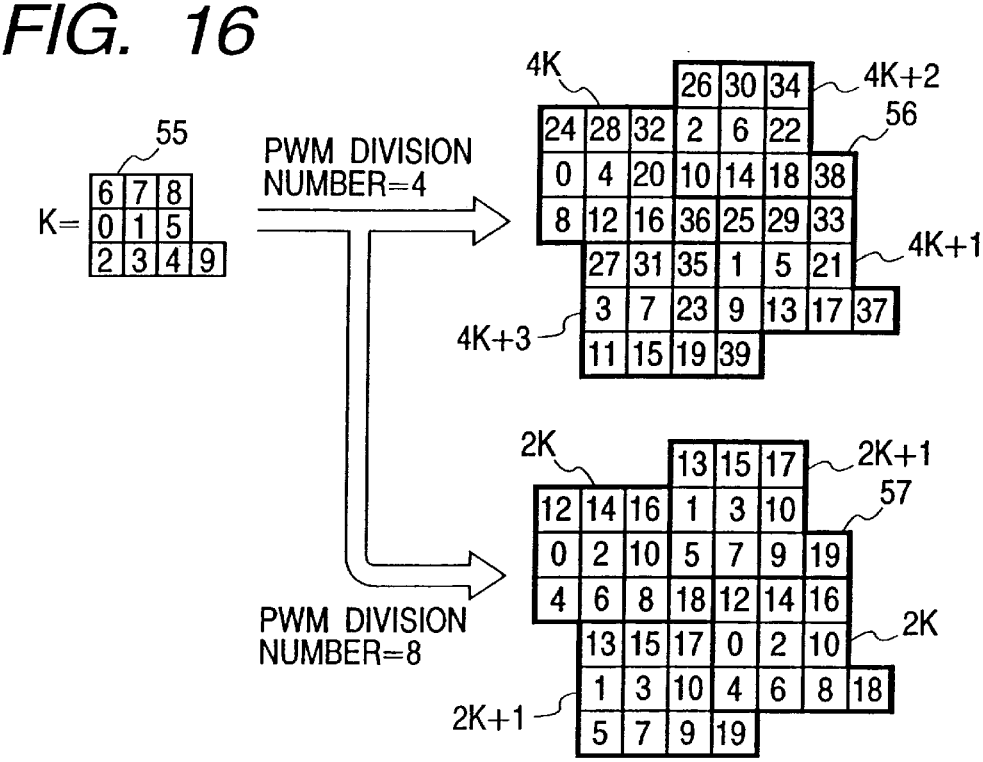
FIG. 16 is a flow diagram which shows an example for composing an extended threshold array corresponding to the bit partitioning circuit.
FIG. 17 is a table showing a total number of gradations to each basic threshold pattern in the bit partitioning circuit.

FIG. 16 shows a method for composing a threshold pattern suitable for the bit partitioning circuit in FIG. 13. The method for composing an extended threshold pattern 56 corresponding to PWM division number 4 (2 bits) is the same as that shown in FIG. 8 and is composed of four threshold patterns generated from K, when a basic threshold pattern 55 is K and a threshold interval $\Delta h=4$, by $K \times \Delta h$, $K \times \Delta h+1$, $K \times \Delta h+2$ and $K \times \Delta h+3$. The method for composing the extended threshold pattern 57 corresponding to PWM division number 8 (3 bits) is also the same as that shown in FIG. 11. The method for obtaining a threshold array and a simplified threshold array from the extended threshold pattern is also the same as the case shown in FIG. 8.

Figure 18:
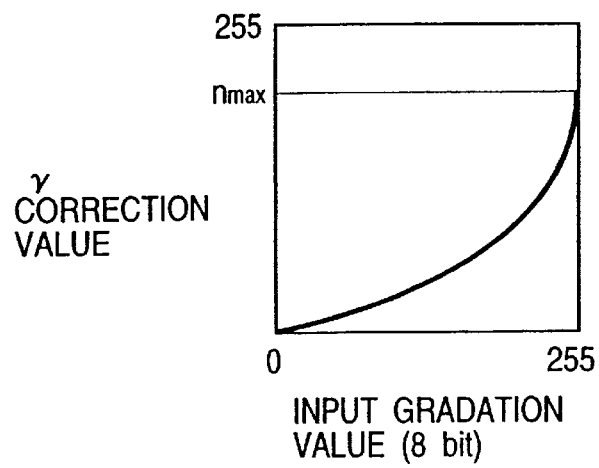
FIG. 18 is a graph showing an example of γ correction whose upper limit is the total number of gradations.

In the case of the threshold pattern 56, the total number of gradations=(number of cells)×(PWM division number)+1= 40×4+1=161, so that the range of input gradation values which can be handled is 161 gray levels of $n_i=0$ to 160. Accordingly, as is apparent also from FIG. 15, although the PWM output values with respect to the input gradation value exceeding 160 are all a maximum value of 4, this may be readily corrected by suppressing the γ correction value of the γ correcting means 7 at the pre-stage of the halftoning unit 9 to a value not exceeding the total number of gradations $n_{max}$ as shown in FIG. 18.

FIG. 17 shows examples of a PWM division number and $\Delta h$ suitable to various basic threshold patterns. In contrast to the cases of the above-mentioned round-up circuit and the round-down circuit, the relationship with the total number of gradations is as follows in case of the bit partitioning circuit:

(total number of gradations)=(number of cells)×$\Delta h$×(PWN division number)+1

Figure 19:
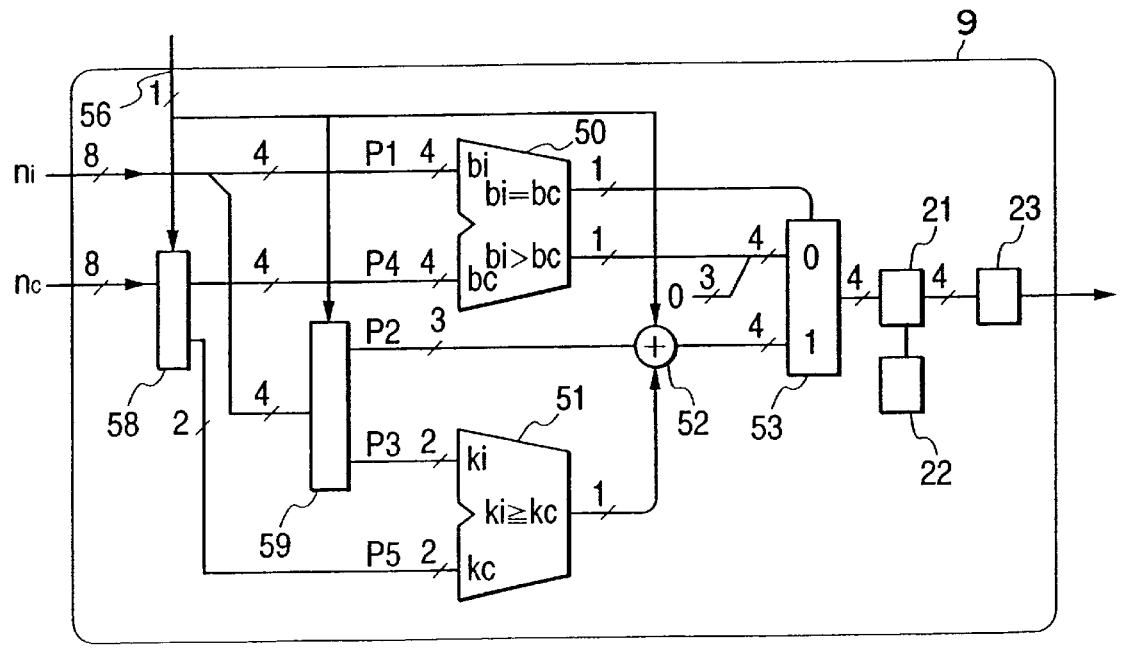
FIG. 19 is a schematic diagram showing an example of the bit partitioning circuit varying bit partitioning.

The difference between the case of the PWM division number 4 and that of the PWM division number 8 in the halftoning unit 9 in FIG. 13 is that only the input gradation value $n_i$ of the input pixel and the number of the bit split of the threshold value $n_c$ (bit width) are different. Accordingly, the PWM division number may be switched by providing dividing circuits 58 and 59 before the comparator 50 and 51 as shown in FIG. 19 and by varying the bit width of the bit division by a selection signal 56.

In the example shown in FIG. 19, respective signal lines P1 through P5 have a bit width as follows: P1=P4=4 bits, P2=3 bits and P3=P5=2 bits. The selection signal 56 is a signal, set in advance in a register not shown per each color face, for deciding the number of divisions of P1, P2 and P3. In the present embodiment, there are provided two selection signals of 0 and 1 (1 bit) so that the PWM division number becomes 8 or 4.

When the selection signal 56 is 0, a dividing circuit 59 divides the upper 3 bits of the lower 4 bits of the gradation value $n_i$ of the input pixel to P2 and the lower 1 bit to the upper 1 bit of P3 (the lower 1 bit of P3 is 0). Further, the dividing circuit 58 divides the middle order 4 bits of the threshold value $n_c$ of 8 bits to P4 and the lower 1 bit to P5 (the lower bit of P5 is 0) by neglecting the top 3 bits. By dividing the bits as described above, the circuit shown in FIG. 19 becomes a circuit equivalent to that in the case of PWM division number 8 in FIG. 13.

When the selection signal 56 is 1, the dividing circuit 59 divides the upper 2 bits of the lower 4 bits of the input gradation value $n_i$ of the input pixel to the upper 2 bit of P2 (the lower 1 bit of P2 is 0) and the lower 2 bits to P3 and outputs them to the comparator 51. The dividing circuit 58 divides the middle order 4 bits of the threshold value $n_c$ of 8 bits to P4 and the lower 2 bits to P5 by neglecting the top 3 bits. When the value inputted to the selection signal 56 is 1, an output from the comparator 51 is doubled by an adder circuit 52 (=by shifting by 1 bit) to add to P2. Thereby, the circuit shown in FIG. 19 becomes a circuit equivalent to that in the case of PWM division number 4 in FIG. 13.

Figure 20:
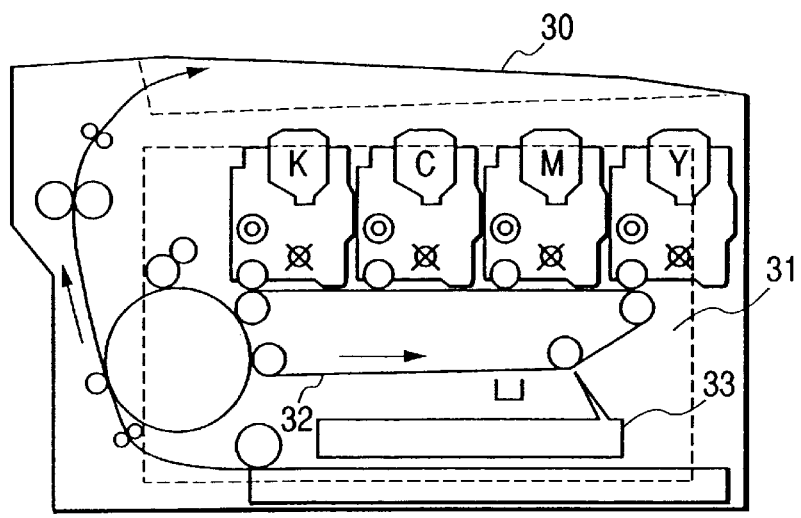
FIG. 20 is a diagram which shows an exemplary color laser printer in which the inventive halftoning unit is mounted.
Figure 21:
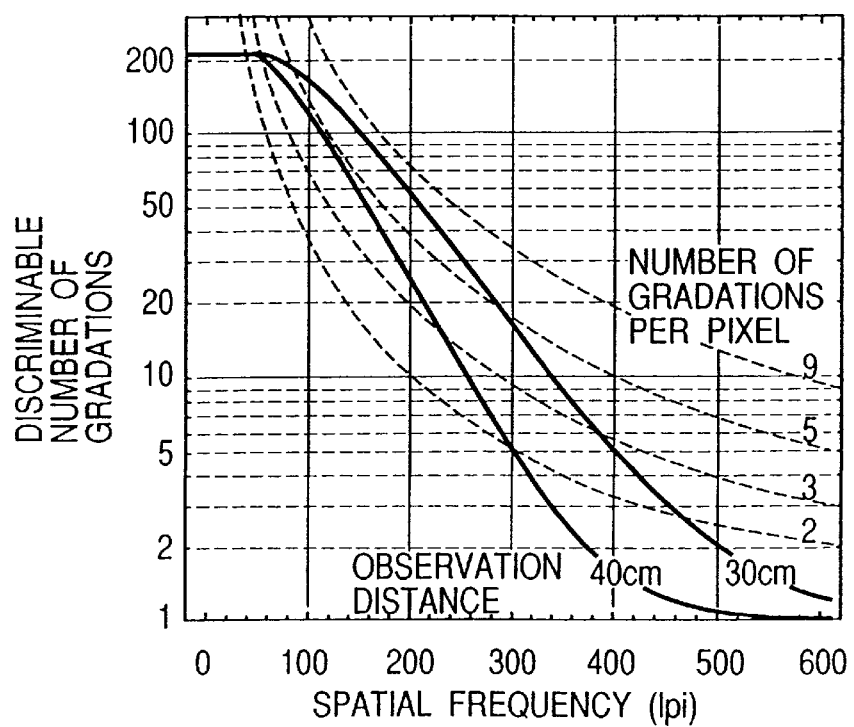
FIG. 21 is a graph showing gradation discriminating characteristics of human eyes.

FIG. 20 shows a structure of a color laser printer 30 containing a controller board 31 carrying the halftoning unit 9 in any one of the embodiments described above. The controller board 31 is shown by a broken line because it is mounted vertically relative to the bottom of the printer in parallel with the mechanical parts. The inventive halftoning unit develops an input image signal in real-time in synchronism with a horizontal synchronizing signal and a vertical synchronizing signal controlling a photoreceptor belt 32 and a laser optical unit 33 and forms an electrostatic latent image on the photoreceptor belt.

It is noted that color printing has been exemplified in the embodiments described above, however it is needless to say that the inventive halftoning unit is applicable also to monochromic printing. Further, although the s bit has been inputted to the PWM level correcting circuit 21 as 4 bits to set the division number of PWM at 16 in the present embodiment, the number of bits of the s bit to be truncated conforming to another value also changes when the division number of PWM is changed to the other value.

As described above, the present invention realizes distributed PWM processing in conjunction with clustered dot concentrated dither screening with a screen angle using a small scale circuit structure. Thereby, a high resolution, high gradation and stable halftoning unit may be readily mounted on an ASIC.

While the preferred embodiments have been described, variations thereto will occur to those skilled in the art within the scope of the present inventive concepts which are delineated by the following claims.

What is claimed is:

1. A halftoning unit comprising a threshold array converting an input gradation value $n_i$ of an input pixel of 8 bits (=256 levels) per pixel into an output gradation value which can be rendered with less bit width by sequentially comparing with a threshold value $n_c$ of the threshold array;

wherein the output gradation value is determined with the lower s bits of $(n_i-n_c+n_O)$ with respect to an adequate constant $n_O$ and any one of values of s=1, 2, 3, and 4.

2. A printer comprising a threshold array for control of a multi-level output gradation value to an output minimum pixel by sequentially comparing an input gradation value $n_i$ of an inputted pixel of 8 bits (=256 levels) per pixel and a threshold value $n_c$ of the threshold array;

wherein the output gradation value is determined with the lower s bits of $(n_i-n_c+n_O)$ with respect to an adequate constant $n_O$ and any one of values of s=1, 2, 3, and 4.

3. A printer according to claim 2, wherein an output image with respect to the increase of input gradation value is a halftone screen which consists of a lattice of halftone dots whose gradation increases cyclically among halftone dots of $2^s$.

4. A printer according to claim 2, wherein multi-color printing of at least two colors or more is performed per each color face and the threshold array and the value of s may be changed per each color face.

* * * * *